US011503126B2

(12) United States Patent
Chen

(10) Patent No.: US 11,503,126 B2
(45) Date of Patent: *Nov. 15, 2022

(54) RECEIVING MEDIA CONTENT BASED ON USER MEDIA PREFERENCES

(71) Applicant: Sonos, Inc., Santa Barbara, CA (US)

(72) Inventor: Yean-Nian W. Chen, Pasadena, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,067

(22) Filed: Apr. 26, 2021

(65) Prior Publication Data

US 2021/0352161 A1    Nov. 11, 2021

Related U.S. Application Data

(63) Continuation of application No. 16/779,630, filed on Feb. 2, 2020, now Pat. No. 10,992,775, which is a (Continued)

(51) Int. Cl.
*H04L 67/306* (2022.01)
*G06F 16/435* (2019.01)
(Continued)

(52) U.S. Cl.
CPC .......... *H04L 67/306* (2013.01); *G06F 16/435* (2019.01); *G06F 16/4387* (2019.01);
(Continued)

(58) Field of Classification Search
CPC ... H04L 67/306; H04L 65/4084; H04L 65/60; G06F 16/435; G06F 16/4387;
(Continued)

(56) References Cited

U.S. PATENT DOCUMENTS 5,440,644 A    8/1995    Farinelli et al.
5,761,320 A    6/1998    Farinelli et al.
(Continued)

FOREIGN PATENT DOCUMENTS

EP    1389853 A1    2/2004
KR    100890993    3/2009
(Continued)

OTHER PUBLICATIONS

Advisory Action dated Dec. 9, 2016, issued in connection with U.S. Appl. No. 14/263,777, filed Apr. 28, 2014, 5 pages.
(Continued)

*Primary Examiner* — Aftab N. Khan
(74) *Attorney, Agent, or Firm* — Fortem IP LLP; Benjamin Urban

(57) ABSTRACT

Embodiments are provided for receiving media content based on the user media preferences. An example implementation includes a one or more servers receiving data representing a guest list for an upcoming event corresponding to a first user account, the guest list indicating multiple guests corresponding to respective second user accounts of a second cloud service and querying one or more streaming media services for music preferences corresponding to the multiple guests. The one or more servers receive, from the one or more streaming media services, data representing respective music preferences corresponding to the multiple guests and generate a playlist of audio tracks based on the received respective music preferences corresponding to the multiple guests. During the event, the server(s) cause the playlist to be queued in a playback queue for playback by one or more playback devices of a particular media playback system registered with the first user account.

20 Claims, 6 Drawing Sheets

Related U.S. Application Data continuation of application No. 16/143,378, filed on Sep. 26, 2018, now Pat. No. 10,554,781, which is a continuation of application No. 15/204,644, filed on Jul. 7, 2016, now Pat. No. 10,122,819, which is a continuation of application No. 14/263,777, filed on Apr. 28, 2014, now Pat. No. 9,680,960.

(51) Int. Cl.

| | |
|---|---|
| *G06F 16/438* | (2019.01) |
| *H04N 21/2665* | (2011.01) |
| *H04N 21/25* | (2011.01) |
| *H04N 21/475* | (2011.01) |
| *H04N 21/482* | (2011.01) |
| *H04N 21/658* | (2011.01) |
| *H04L 65/612* | (2022.01) |
| *H04N 21/00* | (2011.01) |
| *H04L 65/60* | (2022.01) |

(52) U.S. Cl.
CPC ............ *H04L 65/60* (2013.01); *H04L 65/612* (2022.05); *H04N 21/00* (2013.01); *H04N 21/252* (2013.01); *H04N 21/2665* (2013.01); *H04N 21/4751* (2013.01); *H04N 21/4825* (2013.01); *H04N 21/658* (2013.01)

(58) Field of Classification Search
CPC .. H04N 21/00; H04N 21/252; H04N 21/2665; H04N 21/4751; H04N 21/4825; H04N 21/658

See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,108,686 A | 8/2000 | Williams, Jr. | |
| 6,256,554 B1 | 7/2001 | DiLorenzo | |
| 6,349,339 B1 | 2/2002 | Williams | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,826,283 B1 | 11/2004 | Wheeler et al. | |
| 6,829,638 B1* | 12/2004 | McBrearty | H04L 67/1002 709/219 |
| 6,985,694 B1 | 1/2006 | De Bonet et al. | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,739 B2 | 6/2007 | Chang | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,496,623 B2 | 2/2009 | Szeto et al. | |
| 7,496,633 B2 | 2/2009 | Szeto et al. | |
| 7,571,014 B1 | 8/2009 | Lambourne et al. | |
| 7,599,685 B2 | 10/2009 | Goldberg et al. | |
| 7,630,501 B2 | 12/2009 | Blank et al. | |
| 7,643,894 B2 | 1/2010 | Braithwaite et al. | |
| 7,657,224 B2 | 2/2010 | Goldberg et al. | |
| 7,657,910 B1 | 2/2010 | McAulay et al. | |
| 7,725,533 B2 | 5/2010 | Szeto et al. | |
| 7,725,551 B2 | 5/2010 | Szeto et al. | |
| 7,739,271 B2 | 6/2010 | Cook et al. | |
| 7,742,740 B2 | 6/2010 | Goldberg et al. | |
| 7,835,689 B2 | 11/2010 | Goldberg et al. | |
| 7,853,341 B2 | 12/2010 | McCarty et al. | |
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 7,987,294 B2 | 7/2011 | Bryce et al. | |
| 3,014,423 A1 | 9/2011 | Thaler et al. | |
| 8,023,663 B2 | 9/2011 | Goldberg | |
| 8,028,038 B2 | 9/2011 | Weel | |
| 8,028,323 B2 | 9/2011 | Weel | |
| 8,045,952 B2 | 10/2011 | Qureshey et al. | |
| 8,050,652 B2 | 11/2011 | Qureshey et al. | |
| 8,103,009 B2 | 1/2012 | McCarty et al. | |
| 8,214,873 B2 | 7/2012 | Weel | |
| 8,230,099 B2 | 7/2012 | Weel | |
| 8,234,395 B2 | 7/2012 | Millington | |
| 8,483,853 B1 | 7/2013 | Lambourne | |
| 8,910,265 B2* | 12/2014 | Lang | H04L 65/4069 726/9 |
| 9,286,384 B2 | 3/2016 | Kuper et al. | |
| 9,335,818 B2 | 5/2016 | Ye et al. | |
| 9,367,587 B2 | 6/2016 | Bieschke et al. | |
| 9,374,607 B2 | 6/2016 | Bates et al. | |
| 9,665,339 B2 | 5/2017 | Reimann et al. | |
| 10,296,884 B2 | 5/2019 | Lang et al. | |
| 2001/0042107 A1 | 11/2001 | Palm | |
| 2002/0002483 A1 | 1/2002 | Siegel et al. | |
| 2002/0022453 A1 | 2/2002 | Balog et al. | |
| 2002/0026442 A1 | 2/2002 | Lipscomb et al. | |
| 2002/0056117 A1 | 5/2002 | Hasegawa et al. | |
| 2002/0068558 A1 | 6/2002 | Janik | |
| 2002/0124097 A1 | 9/2002 | Isely et al. | |
| 2002/0138641 A1 | 9/2002 | Taylor et al. | |
| 2003/0157951 A1 | 8/2003 | Hasty, Jr. | |
| 2004/0024478 A1 | 2/2004 | Hans et al. | |
| 2004/0088328 A1 | 5/2004 | Cook et al. | |
| 2006/0253436 A1 | 11/2006 | Cook et al. | |
| 2007/0025194 A1* | 2/2007 | Morse | G06F 16/9535 369/30.1 |
| 2007/0083553 A1* | 4/2007 | Minor | G06F 16/4387 |
| 2007/0088747 A1 | 4/2007 | Cheng et al. | |
| 2007/0142944 A1 | 6/2007 | Goldberg et al. | |
| 2007/0294131 A1 | 12/2007 | Roman et al. | |
| 2008/0052371 A1 | 2/2008 | Partovi et al. | |
| 2009/0013260 A1 | 1/2009 | Martin et al. | |
| 2009/0138805 A1 | 5/2009 | Hildreth | |
| 2009/0307062 A1 | 12/2009 | Lutnick et al. | |
| 2010/0017366 A1 | 1/2010 | Robertson et al. | |
| 2010/0082804 A1 | 4/2010 | Patel et al. | |
| 2010/0131385 A1 | 5/2010 | Harrang et al. | |
| 2010/0205222 A1 | 8/2010 | Gajdos et al. | |
| 2010/0262909 A1 | 10/2010 | Hsieh | |
| 2010/0325135 A1* | 12/2010 | Chen | G06F 16/4387 707/769 |
| 2011/0246566 A1* | 10/2011 | Kashef | G06F 16/437 709/203 |
| 2012/0059707 A1 | 3/2012 | Goenka et al. | |
| 2012/0071996 A1 | 3/2012 | Svendsen | |
| 2013/0173034 A1* | 7/2013 | Reimann | G06F 16/635 700/94 |
| 2013/0191454 A1 | 7/2013 | Oliver et al. | |
| 2014/0039945 A1 | 2/2014 | Coady et al. | |
| 2015/0113022 A1* | 4/2015 | Martin | G06F 16/683 707/796 |
| 2020/0201596 A1* | 6/2020 | Kidron | H04W 4/70 |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth "Specification of the Bluetooth System: The ad hoc Scatternet for affordable and highly functional wireless connectivity," Core, Version 1.0 A, Jul. 26, 1999, 1068 pages.

(56) References Cited

OTHER PUBLICATIONS

Bluetooth "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Sep. 30, 2016, issued in connection with U.S. Appl. No. 14/263,777, filed Apr. 28, 2014, 19 pages.
International Bureau, International Preliminary Report on Patentability dated Apr. 3, 2014, issued in connection with International Application No. PCT/US2012/056467, filed on Sep. 21, 2011, 11 pages.
International Searhing Authority, International Search Report and Written Opinion dated Feb. 28, 2013, issued in connection with International Application No. PCT/US2012/056467, filed on Sep. 21, 2012, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Mar. 28, 2016, issued in connection with U.S. Appl. No. 14/263,777, filed Apr. 28, 2014, 15 pages.
Notice of Allowance dated Apr. 18, 2018, issued in connection with U.S. Appl. No. 15/204,644, filed Jul. 7, 2016, 20 pages.
Notice of Allowance dated Feb. 23, 2017, issued in connection with U.S. Appl. No. 14/263,777, filed Apr. 28, 2014, 9 pages.
Notice of Allowance dated Dec. 29, 2020, issued in connection with U.S. Appl. No. 16/779,630, filed Feb. 2, 2020, 17 pages.
Notice of Allowance dated Sep. 30, 2019, issued in connection with U.S. Appl. No. 16/143,378, filed Sep. 26, 2018, 16 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

RECEIVING MEDIA CONTENT BASED ON USER MEDIA PREFERENCES

CROSS-REFERENCE TO RELATED APPLICATIONS

This application claims priority under 35 U.S.C. § 120 to, and is a continuation of, U.S. non-provisional patent application Ser. No. 16/779,630, filed on Feb. 2, 2020, entitled "Receiving Media Content Based on User Media Preferences," which is incorporated herein by reference in its entirety.

U.S. non-provisional patent application Ser. No. 16/779,630 claims priority under 35 U.S.C. § 120 to, and is a continuation of, U.S. non-provisional patent application Ser. No. 16/143,378, filed on Sep. 26, 2018, entitled "Receiving Media Content Based on User Media Preferences," and issued as U.S. Pat. No. 10,554,781 on Feb. 4, 2020, which is incorporated herein by reference in its entirety.

U.S. non-provisional patent application Ser. No. 16/143,378 claims priority under 35 U.S.C. § 120 to, and is a continuation of, U.S. non-provisional patent application Ser. No. 15/204,644, filed on Jul. 7, 2016, entitled "Receiving Media Content Based on Media Preferences of Additional Users," and issued as U.S. Pat. No. 10,122,819 on Nov. 6, 2018, which is incorporated herein by reference in its entirety.

U.S. non-provisional patent application Ser. No. 15/204,644 claims priority under 35 U.S.C. § 120 to, and is a continuation of, U.S. non-provisional patent application Ser. No. 14/263,777, filed on Apr. 28, 2014, entitled "Receiving Media Content Based on Media Preferences of Multiple Users," issued as U.S. Pat. No. 9,680,960 on Jun. 13, 2017, which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
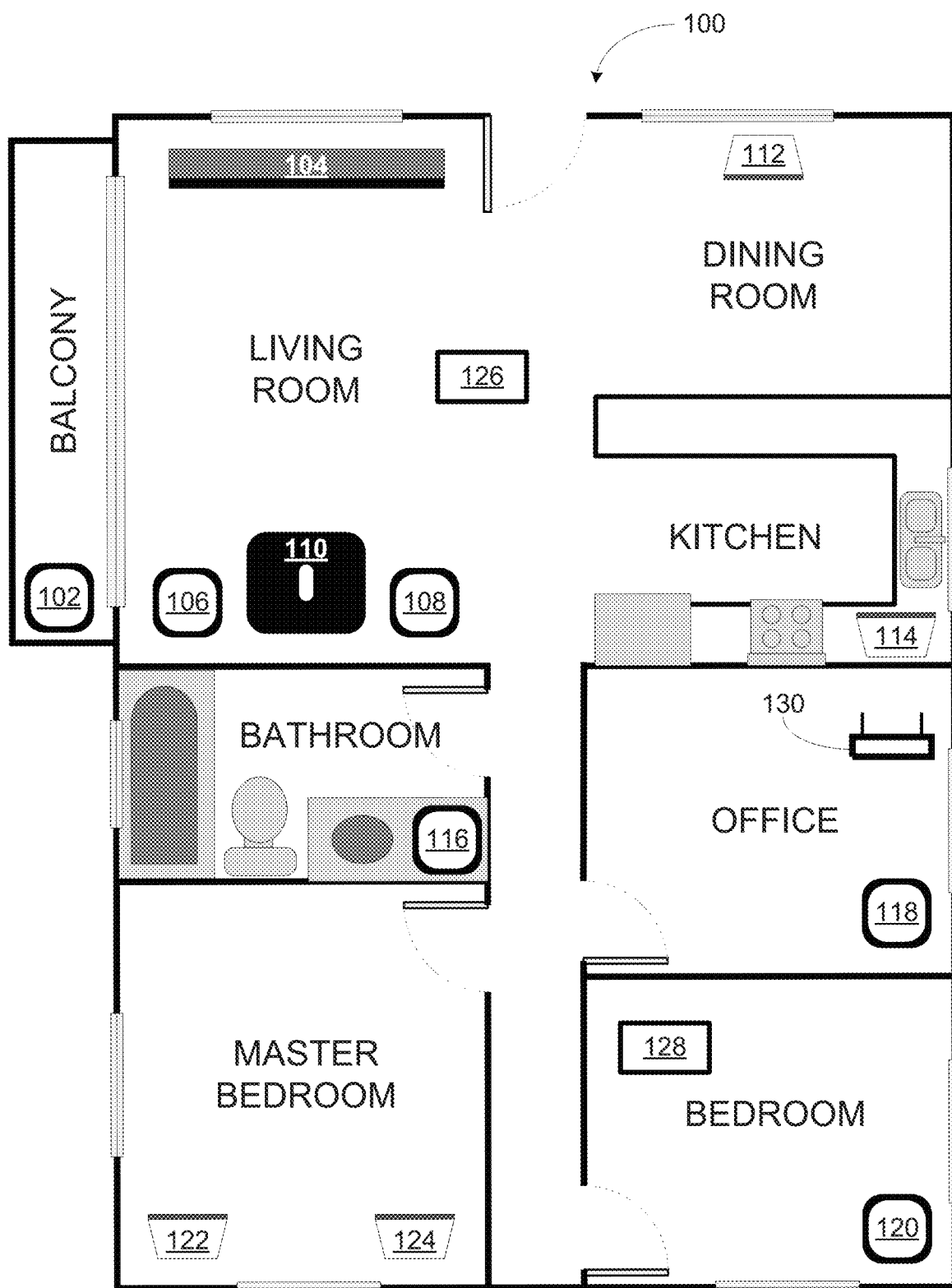
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve receiving media content based on media preferences of multiple users. In one embodiment, a computing device may identify various individuals attending a social event. The computing device may identify these individuals, for example, by using a guest list. The guest list may be from a social network website on which users can RSVP to the social event. Based on the information on the guest list, the computing device may identify user accounts associated with service providers that the guests use to listen to media content. The identified user accounts may include user accounts across multiple service providers.

The computing device may then request that the service providers provide the computing device with media content based on the identified user accounts. In one example, a subset of the identified user accounts may include user accounts for a particular service provider. As such, the computing device may request that the particular service provider provide media content based on the subset of identified user accounts.

In another example, a first subset of the identified user accounts may include user accounts for a first service provider, while a second subset of the identified user accounts may include user accounts for a second service provider. In such a case, the computing device may interact with both the first service provider and the second service provider to request media content for the first subset of identified users, and second subset of identified users, respectively. The computing device may in one case request media content for the first or second subset of identified user accounts as a whole, or alternatively request media content for each individual user account in the first or second subset of identified user accounts. Other examples are also possible.

One or more of the multiple service providers may be a service provider that provides catered playlists and/or recommends media content based on media preferences associated with a respective user account for the service provider. As such, the one or more of the multiple service providers may, in response to the requests from the computing device, provide to the computing device, media content identified based on media preferences of the identified user accounts.

The media content may be received from the service provider in the form of streaming media data that can be played by a media playback system during the social event. The service provider may also provide data identifying the one or more media items to facilitate adding the media items to a playlist or to a playback queue of a media playback system. In this case, a host of the social event may further customize the playlist or the play queue in advance of, or during the social event. Other examples are also possible.

As indicated above, the examples provided herein involve receiving media content based on the preferences of multiple users. In one embodiment, a method is provided. The method involves identifying, by a computing device, a plurality of user accounts associated with a first service provider, sending, by the computing device, to the first service provider, a request for one or more media items based on media preferences associated with the plurality of user accounts associated with the first service provider, and receiving, by the computing device, the one or more media items from the service provider.

In another embodiment, a device is provided. The device includes a processor, and memory having stored thereon instructions executable by the processor to cause the device to perform functions. The functions include identifying a plurality of user accounts associated with a first service provider, sending to the first service provider, a request for one or more media items based on media preferences associated with the plurality of user accounts associated with the first service provider, and receiving the one or more media items from the service provider.

In another embodiment, a non-transitory computer readable memory is provided. The non-transitory computer readable memory has stored thereon instructions executable by a computing device to cause the computing device to perform functions. The functions include identifying a plurality of user accounts associated with a first service provider, sending to the first service provider, a request for one or more media items based on media preferences associated with the plurality of user accounts associated with the first service provider, and receiving the one or more media items.

In another embodiment, a method is provided. The method involves identifying, by a computing device, (i) a first one or more user accounts associated with a first service provider, and (ii) a second one or more user accounts associated with a second service provider. The method further involves, sending, by the computing device to the first service provider, a request for one or more media items based on media preferences associated with the first one or more user accounts, sending, by the computing device to the second service provider, a request for one or more media items based on media preferences associated with the second one or more user accounts, receiving, by the computing device from the first service provider, a first one or more media items, and receiving, by the computing device from the second service provider, a second one or more media items.

In another embodiment, a device is provided. The device includes a processor, and memory having stored thereon instructions executable by the processor to cause the device to perform functions. The functions include identifying, by a computing device (i) a first one or more user accounts associated with a first service provider, and (ii) a second one or more user accounts associated with a second service provider, sending to the first service provider, a request for one or more media items based on media preferences associated with the first one or more user accounts, sending to the second service provider, a request for one or more media items based on media preferences associated with the second one or more user accounts, receiving from the first service provider, a first one or more media items, and receiving from the second service provider, a second one or more media items.

In another embodiment, a non-transitory computer readable memory is provided. The non-transitory computer readable memory has stored thereon instructions executable by a computing device to cause the computing device to perform functions. The functions include identifying, by a computing device (i) a first one or more user accounts associated with a first service provider, and (ii) a second one or more user accounts associated with a second service provider, sending to the first service provider, a request for one or more media items based on media preferences associated with the first one or more user accounts, sending to the second service provider, a request for one or more media items based on media preferences associated with the second one or more user accounts, receiving from the first service provider, a first one or more media items, and receiving from the second service provider, a second one or more media items.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
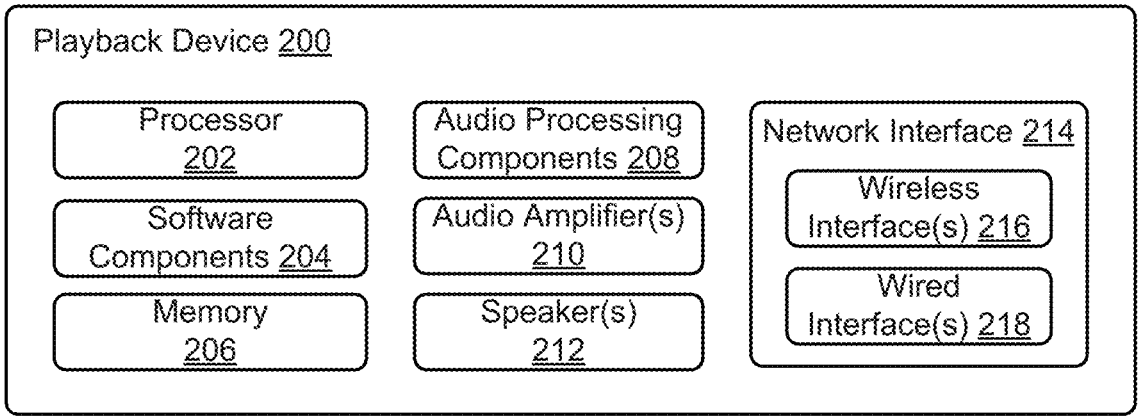
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface (s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
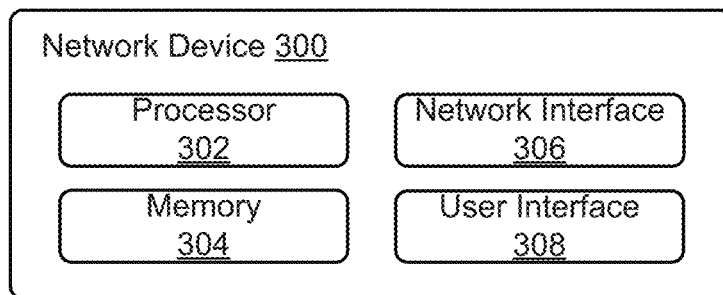
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
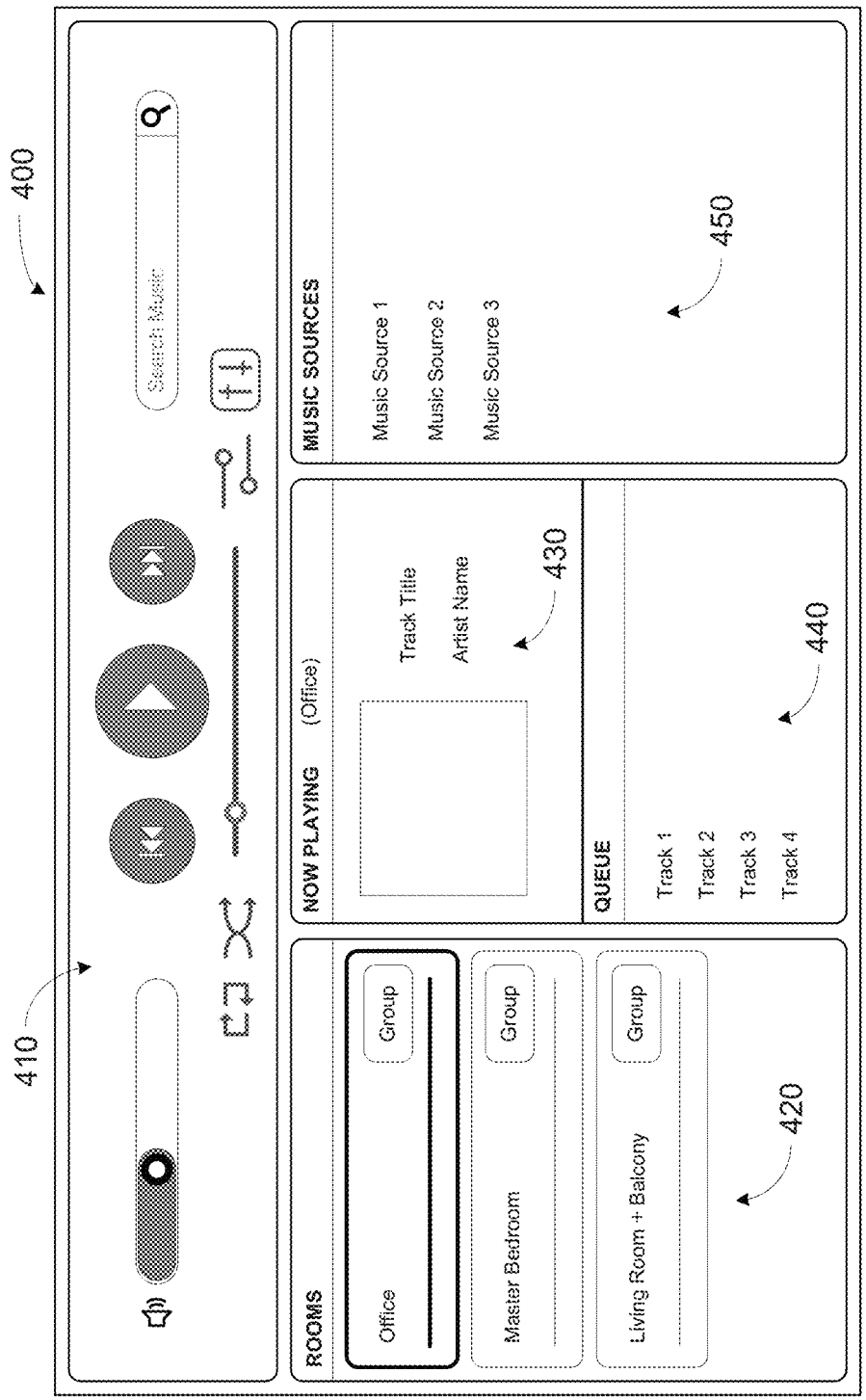
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Receiving Media Content Based on Media Preferences of Multiple Users As indicated above, some embodiments discussed herein involve receiving media content based on media preferences of multiple users. Discussions directed to examples of these embodiments are provided below, beginning with an example media playback environment within which the embodiments may be implemented.

a. Example Media Playback Environment

Figure 5:
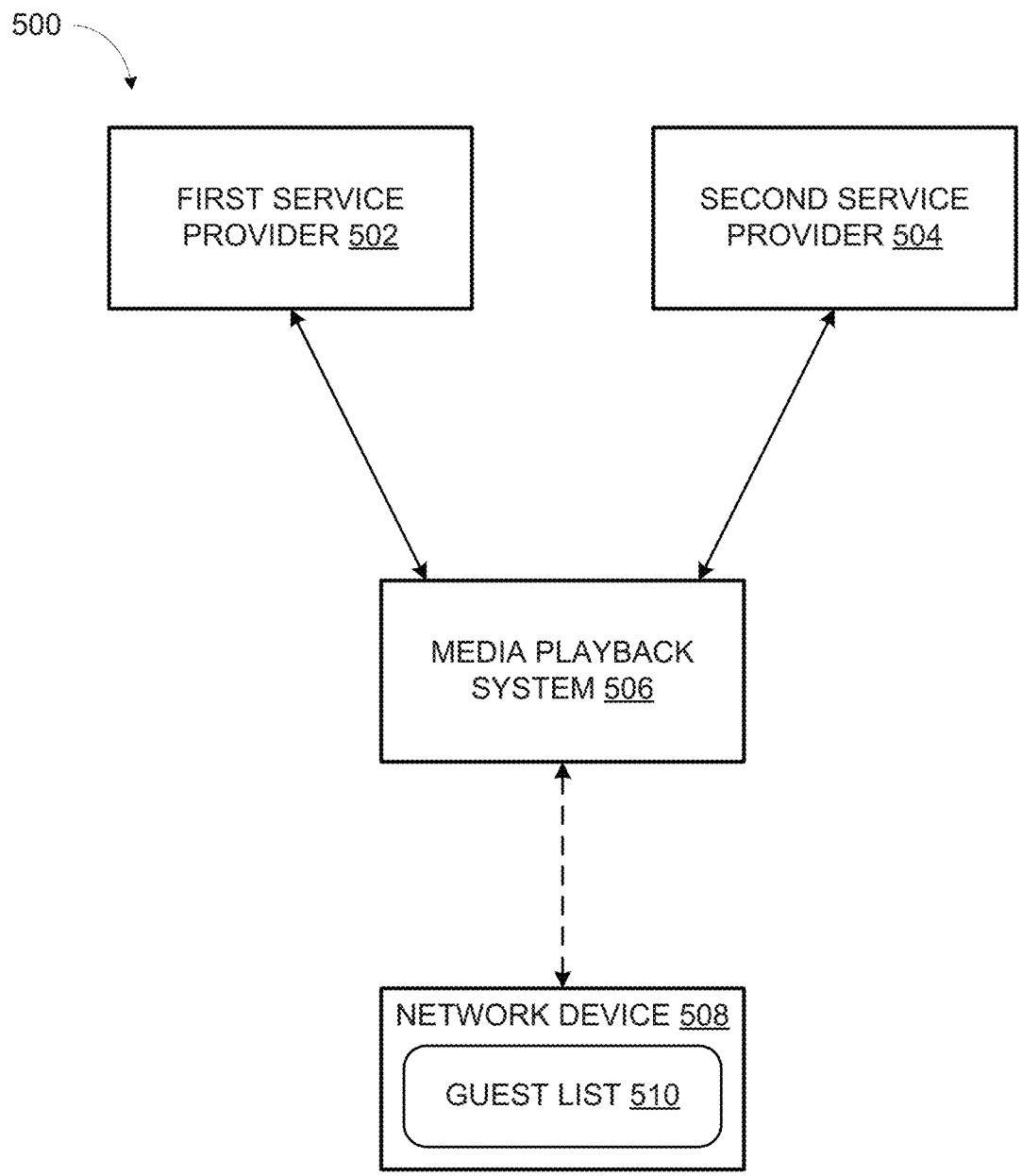
FIG. 5 shows an example media playback environment.

FIG. 5 shows an example media playback environment 500 including a first service provider 502, a second service provider 504, a media playback system 506, and a network device 508 containing a guest list 510. Each of the first service provider 502, second service provider 504, media playback system 506, and network device 508 may communicate with each other either directly or indirectly via another device, over a local area network (LAN), wide area network (WAN) or some combination thereof.

The media playback system 506 may be a playback system such as that described above, and may include one or more playback devices configured to play media content in synchrony within one or more playback zones. In one example, the media playback system 506 may further include, or otherwise be associated with a media system server. The media system server may store information, such as playback device information, playback zone information, service provider association information, and/or user account information, among other information associated with the media playback system 506. One having ordinary skill in the art will appreciate that actions and functions described herein as being performed by the media playback system 506 may be performed in whole or in part by one or more of the media system server, the one or more playback devices, and/or other devices associated with the media playback system 506.

The first service provider 502 and second service provider 504 may be media content service providers configured to provide media content to be played by the media playback system 506. In one example, one or both service providers 502 and 504 may be media streaming service. The content provided by the service providers 502 and/or 504 may include individual media items or collections of media items (i.e. albums, playlists, radio channels, etc.). The service providers 502 and/or 504 may provide media content in response to specific requests for explicitly chosen media items, (i.e. requests for specific tracks, albums, etc), or comparatively general requests for media content (i.e. a catered playlist, radio channels, etc). The service providers 502 and 504 may also provide catered playlists of media content based on user preferences and input. For instance, if a profile of a service provider user account for the service provider 502 indicates that the user enjoys a particular genre of music, the service provider 502 may provide to the user account, music within the particular genre, or music within similar or related genres or with similar audio attributes.

As another example of user preferences, a user may use the user account to create one or more playlists that include media items that the user enjoys. In this case, the service provider can, in response to a request for media content based on user preferences, provide the user account with one or more of the media items within those playlists.

Other examples of services that may be available through service providers 502 and 504 are also possible. One having ordinary skill in the art will appreciate that unless otherwise noted, features, services, and functions discussed herein in relation to the first service provider 502 may also be applied to the second service provider 504. One having ordinary skill in the art will likewise appreciate that unless otherwise noted, features, services, and functions discussed herein in relation to the second service provider 504 may also be applied to first service provider 502.

The guest list 510 stored on the network device 508 may indicate a list of guests to a social event. In one case, the guest list 510 may be generated and maintained via a social network website on which events can be created, guests can be invited, and where guests can RSVP to the events. As such, in one example, the network device 508 may be a server associated with the social network website. Alternatively, the network device 508 may be a personal and/or mobile device on which a user accesses the social network website. In either case, the network device 508 on which the guest list 510 is stored is a device in communication with one or more devices in the media playback system 506. Other examples are also possible.

In one example, the media playback system 506 may be in communication with the social network website, and may accordingly access the guest list 510. In one case, a user may install on the user's social network profile, an application for accessing the media playback system 506. The application may allow the user, while using the social network website, to control playback of media content by the media playback system 506 and/or share information on media content the user is enjoying using the media playback system 506. In one instance, if the user hosts an event that guests may RSVP to on the social network website, the media playback system 506 may access the event's guest list via the application. If a guest also has the application installed on his/her social network profile, information relating to the guest's media playback system settings, such as service providers used by the guest, may be provided to the media playback system 506 via the application.

Figures 6A, 6B:
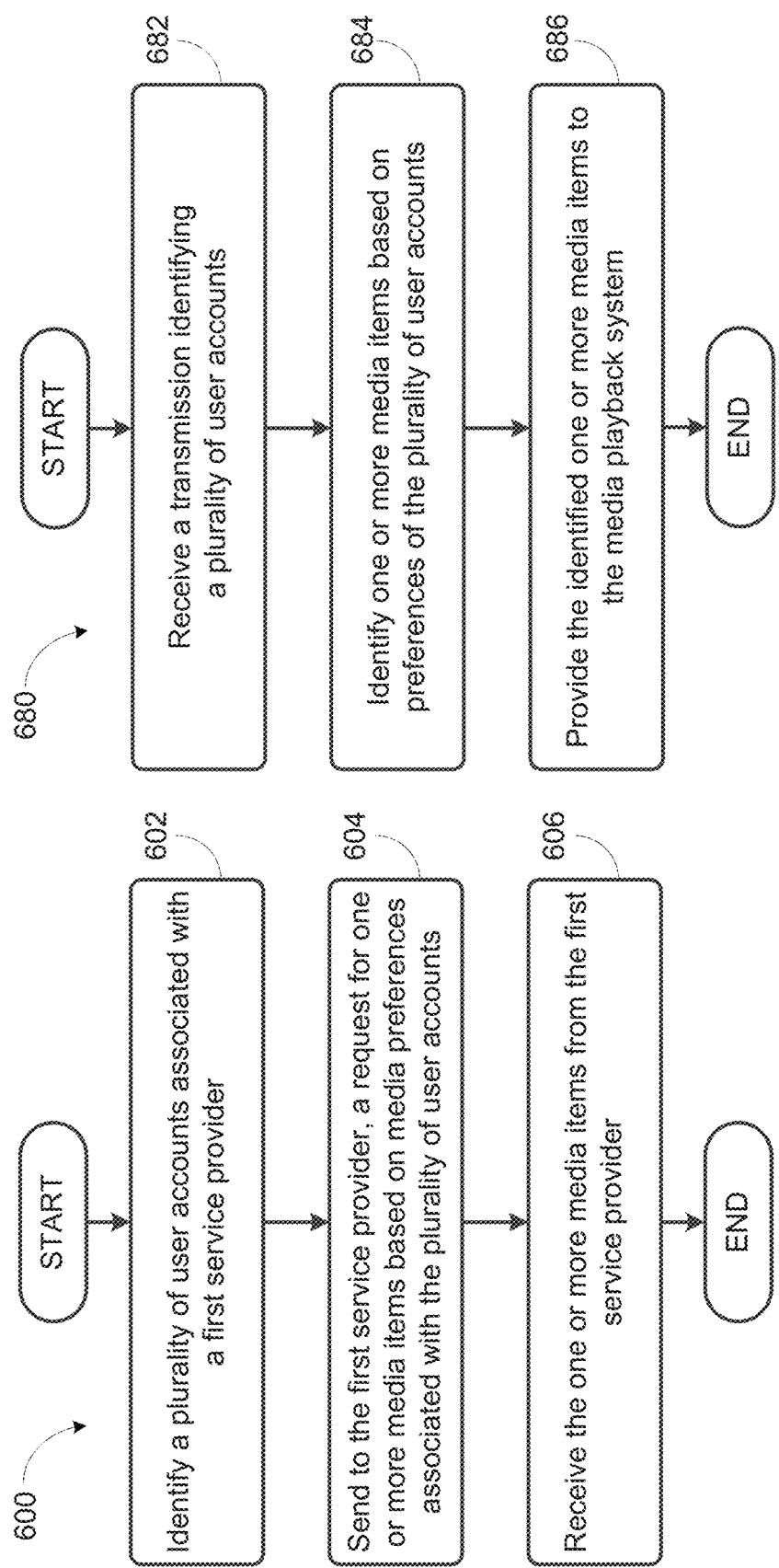
FIG. 6A shows a first example flow diagram for receiving media content based on media preferences of multiple users.
FIG. 6B shows an example flow diagram for identifying media content based on media preferences of multiple users.

In another case, a user may install on the user's social network profile, an application for accessing a service provider, such as the first service provider 502, for example. The application may allow the user, while using the social network website, to control playback of media content from the first service provider 502 and/or share information on media content the user is enjoying using the first service provider 502. In one instance, if the user hosts an event that guests may RSVP to on the social network website, the social network website may provide the guest list 510 to the service provider 502 via the application. If a guest also has the application installed on his/her social network profile, information relating to the guest's service provider 502 settings, such as media preferences of the guest, may be provided to the service provider 502 along with the guest list 510. In this case, the service provider 502 may provide media content based at least partially on the guest list 510, to the media playback system 506 during the event. Other examples are also possible.

b. First Example Method for Receiving Media Content Based on Media Preferences of Multiple Users FIG. 6A shows a first example flow diagram of a method 600 for receiving media content based on media preferences of multiple users. Method 600 shown in FIG. 6A presents an embodiment of a method that can be implemented within an operating environment involving, for example, the media playback system 100 of FIG. 1, one or more of the playback device 200 of FIG. 2, one or more of the control device 300 of FIG. 3, and the media playback environment 500 of FIG. 5. In other words, the method 600 may be performed by any one or more of the devices, systems, and servers described above. Method 600 may include one or more operations, functions, or actions as illustrated by one or more of blocks 602-606. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6A may represent circuitry that is wired to perform the specific logical functions in the process.

A block 602, the method 600 involves identifying a plurality of user accounts associated with a first service provider. In one example, identifying the plurality of user accounts may involve accessing/receiving a guest list, and identifying the plurality of user accounts on the guest list. Referring to the media playback environment 500 of FIG. 5, the media playback system 506 may interface with the network device 508 to access the guest list 510. For illustration purposes, the first service provider may be the first service provider 502. A user account of the plurality of user accounts may be one used by a particular guest on the guest list 510 to access the first service provider 502.

In one example, if the guest list 510 is related to a social event organized via a social network website, each of the guests on the guest list 510 may have a respective user profile. As such, the particular guest's user profile may be linked to a particular user account that the particular guest uses to access the first service provider 502. In some cases, the particular guest's user profile may be linked to the particular user account using an application for the first service provider 502 and/or an application for a media playback system like the media playback system 506. In some cases, linking the particular guest's user profile to the particular user account may allow sharing on the social network website, information relating to what the particular guest is listening to via the first service provider 502. The particular user account may accordingly be identified based on the link between the particular user account and the user profile of the particular guest.

In another example, an email address and/or phone number of the particular guest may be linked to the particular user account that the particular guest uses to access the first service provider 502. For instance, the email address and/or phone number may have been used to register and/or sign up for the particular user account with the first service provider 502. As such, if the guest list 510 identifies an email address and/or phone number of the particular guest, the particular user account may be identified based on the link between the particular user account and the email address and/or phone number of the particular guest. Other examples are also possible.

At block 604, the method 600 involves sending to the first service provider, a request for one or more media items based on media preferences associated with the plurality of user accounts. Upon identifying the plurality of user accounts, the media playback system 506 may send (as part of the request or in addition to the request) to the first service provider 502, a transmission that identifies the plurality of user accounts, and request media content associated with the plurality of user accounts.

Media preferences associated with a user account may include specific media items, artists, genres, and/or other audio attributes that a user of the user account likes or dislikes. In one example, some or all the media preferences associated with the user account may be established based on inputs from the user when the user account was set up and/registered with the respective service provider. In another example, some or all the media preferences associated with the user account may be collected and aggregated over time. For instance, an input indicating a positive or negative preference may be provided while a media item that was provided to the user account from the service provider is being played. The service provider may store the indicated preference in association with the user account as a media preference of the user account. As yet another example, the preferences may be one or more media items within a playlist created using the user account. Other examples are also possible.

At lock 606, the method 600 involves receiving the one or more media items from the first service provider. The one or more media items may be media items identified by the first service provider 502 based on media preferences associated with the plurality of user accounts. In one example, the one or more media items may be received from the first service provider 502 in the form of a stream of media data to be rendered by the media playback system 506. In one case, the first service provider 502 may identify a first media item, and begin streaming media data corresponding to the first media item while identifying a second media item to be streamed next. In such a case, the first service provider 502 may produce a catered radio channel based on the media preferences of the plurality of user accounts.

In another example, the one or more media items may be received in the form of information identifying the one or more media items. For instance, metadata associated with each of the one or more media items may be provided by the first service provider 502. In one case, the one or more media items may be added to a playback queue associated with a playback zone of the media playback system 506. The one or more media items in the playback queue may then be modified by a user with access to the media playback system 506 (for example, a host of the social event) to the liking of the user. The user may be an individual with certain access privileges to the media playback system 506. In some cases, the playback queue may be saved as a playlist and later retrieved for playback during the social event. Alternatively, the one or more media items may be automatically saved as a playlist, or added to an existing playlist. In such a case, the playlist may be subsequently modified to the user's liking and then added to the playback queue for playback. Other examples are also possible.

In some embodiments, the first service provider 502 and the second service provider 504 may be service providers to which a user (or users) of the media playback system 506 has access. In other words, the user may have respective user accounts for the first service provider 502 and the second service provider 504. In such cases, links or URLs to the identified media items provided by the first service provider 502 and/or the second service provider 502 may be directly added to the playback queue or playlist.

In some other embodiments, the user (or users) of the media playback system 506 may not have access to one or both of the first service provider 502 and the second service provider 504. For instance, the user of the media playback system may have access to the second service provider 504, but not the first service provider 502. In such a case, if and when media items are provided by the first service provider 502, the media playback system 506 may identify media items available from the second service provider 504 that match the media items identified by the first service provider 502. In one example, the matching of the media items may be based on metadata for the media items provided by the second service provider 504. Links or URLs to the matching media items available from the first service provider 502 may then be added to the playback queue or playlist.

In another instance, the user of the media playback system 506 may not have access to the first service provider 502 or the second service provider 504. In such a case, a guest user account for accessing the first and/or the second service providers 502 and 504 may be used to access the first and/or second service providers 502 and 504. The guest user account may be a user account of a guest on the guest list. The first and/or second service providers 502 and 504 may provide the user of the media playback system 506 with access using the guest user accounts for a limited time, such as for example, a duration of the event. Other examples are also possible.

While method 600 as described above generally illustrate an example for obtaining media content provided by a single service provider based on media preferences of a plurality of user accounts identified as being associated with the single service provider, one having ordinary skill in the art will appreciate that other implementations within the scope of the discussions herein are also possible. For instance, one or more user accounts for accessing another service provider, such as the second service provider 504 may also be identified based on the guest list 510. In this case, the second service provider 504 may identify media items based on the media preferences of the one or more user accounts for accessing the second service provider 504, and provide the identified media items to the media playback system 506.

In one instance, the media items provided by the first service provider 502 and the media items provided by the second service provider 504 may be automatically added to the same playlist and/or same playback queue. In another instance, the media items provided by the first service provider 502 and the media items provided by the second service provider 504 may be automatically added to different playlists. The media items added to the playlists and/or playback queue may then be used when entertaining the guests during the social event. As suggested above, the host of the social event may modify the playlist and/or playback queue to further cater the media items to the social event. Other examples are also possible.

Further, in another example, the media playback system 506 may not identify the plurality of user accounts associated with the first service provider 502, as described in connection to block 602. Instead, as previously discussed, if the guest list 510 is maintained on a social network website, the social network website may provide directly to the first service provider 502, data identifying user accounts associated with guests on the guest list 510. In such a case, the media playback system 506 may request from the first service provider 502, one or more media items for the social event, and the first service provider 502 may provide the media playback system 506 media items identified based on media preferences associated with the plurality of user accounts provided by the social network website. In this case, the request for media items from the media playback system 506 may include information identifying the social event.

In another case, if the first service provider 502 provides streaming media data, and the information identifying the social event includes a start and end time of the social event, the first service provider 502 may provide for the duration of the event, media content based on media preferences associated with the plurality of user accounts. Once the social event time expires, the first service provider 502 may resume to providing media content based on media preferences of the user of the media playback system 506.

In a further case, as mentioned previously, the user of the media playback system 506 may or may not have access to the first service provider 502. If the user does not have access to the first service provider 502, the first service provider 502, in response to the request from the media playback system 506, may provide to the media playback system 506 for the duration of the social event (and in some cases, for some time prior to the social event), access to the one or more media items identified by the first service provider 502 based on media preferences associated with the plurality of user accounts identified by the social network website. Other examples are also possible.

As mentioned previously, the first service provider 502 and the second service provider 504 may both be service providers capable of identifying media content based on preferences of a user account. In some cases, however, the first service provider 502 and/or the second service provider 504 may not be configured to identify media content based on preferences of multiple user accounts. FIG. 6B shows an example flow diagram of a method 680 for an embodiment in which a service provider, such as the first service provider 502 and/or the second service provider 504 provides the media items based on the profiles of a plurality of user accounts. Method 680 shown in FIG. 6B presents an embodiment of a method that can be implemented within an operating environment involving, for example, the media playback system 100 of FIG. 1, one or more of the playback device 200 of FIG. 2, one or more of the control device 300 of FIG. 3, and the media playback environment 500 of FIG. 5. In other words, the method 680 may be performed by any one or more of the devices, systems, and servers described above. In one example, the functions discussed in relation to the method 680 may be performed by one the service provider 502. Method 680 may include one or more operations, functions, or actions as illustrated by one or more of blocks 682-686. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 682, the method 680 involves receiving a transmission identifying a plurality of user accounts. In one example, the plurality of user accounts may be the plurality of user accounts associated with the first service provider 502, as identified by the media playback system 506 at block 602 of FIG. 6A. In this case, the transmission may be received from the media playback system 506. In another example, the plurality of user accounts may be user accounts identified on the guest list 510 received directly from the social network website on which the guest list 510 is generated and maintained.

At block 684, the method 680 involves identifying one or more media items based on the preferences the plurality of user accounts. As one example, the service provider 502 may analyze the preferences of the identified user accounts, and based on those preferences, identify media content. Continuing with the example, if each of the preferences of the identified user accounts indicate a preference for smooth jazz music, the service provider 502 may identify a smooth jazz song. In another example, the media items may be identified by ignoring a media item that has a negative preference associated with any of the plurality of user accounts.

In some cases, identifying common preferences among the plurality of user accounts may be difficult, for example, if there are a large number of user accounts. In such a situation, media items may be identified based on the most common preference amongst the plurality of users. As another example, the media item that has the most number of "likes" (or any other form of positive preference) across the plurality of user accounts may be identified, regardless of whether one of the plurality of user accounts has a negative preference associated with the media item.

As another example, a cumulative preference percentage for the media item may be determined. The cumulative preference percentage of the media item may be determined as a percentage of the identified user accounts that have a negative preference associated with the media item subtracted from a percentage of the identified user accounts that have a positive preference associated with the media item. As such, if eight out of 10 identified user accounts have a positive preference associated with the particular genre of music, but the remaining two identified user accounts have a negative preference associated with the particular genre of music, the cumulative preference percentage may be 80%–20%=60%. In such a case, a media item with the highest cumulative preference percentage may be selected.

As yet another example, songs may be identified for each of the plurality of user accounts based on the preferences of that account. If any of the identified songs are common between the profiles, they can be selected for transmission. Other examples are possible as well.

At block 686, the method 680 involves providing the identified one or more media items to the media playback system. Continuing with the examples above, the one or more media items may be provided to the media playback system 506. In addition to providing the media item(s), metadata indicating why the item(s) was selected may also be included. For example, the metadata could identify characteristics common to the preferences of the plurality of user accounts. Providing such metadata will allow users of the media playback system to understand why the media items were selected.

One having ordinary skill in the art will appreciate the method 680 as described above provides just one example of a service provider identifying media content based on media preferences of multiple users. Other examples are also possible.

c. Second Example Method for Receiving Media Content Based on Media Preferences of Multiple Users In some embodiments, one or more of the first service provider 502, second service provider 504, and other service providers for which user accounts may have been identified on the guest list 510, may not be configured to identify and provide media items based on media preferences of multiple users. Method 700 as shown in FIG. 7 provides a method for receiving media content in such a case.

Figure 7:
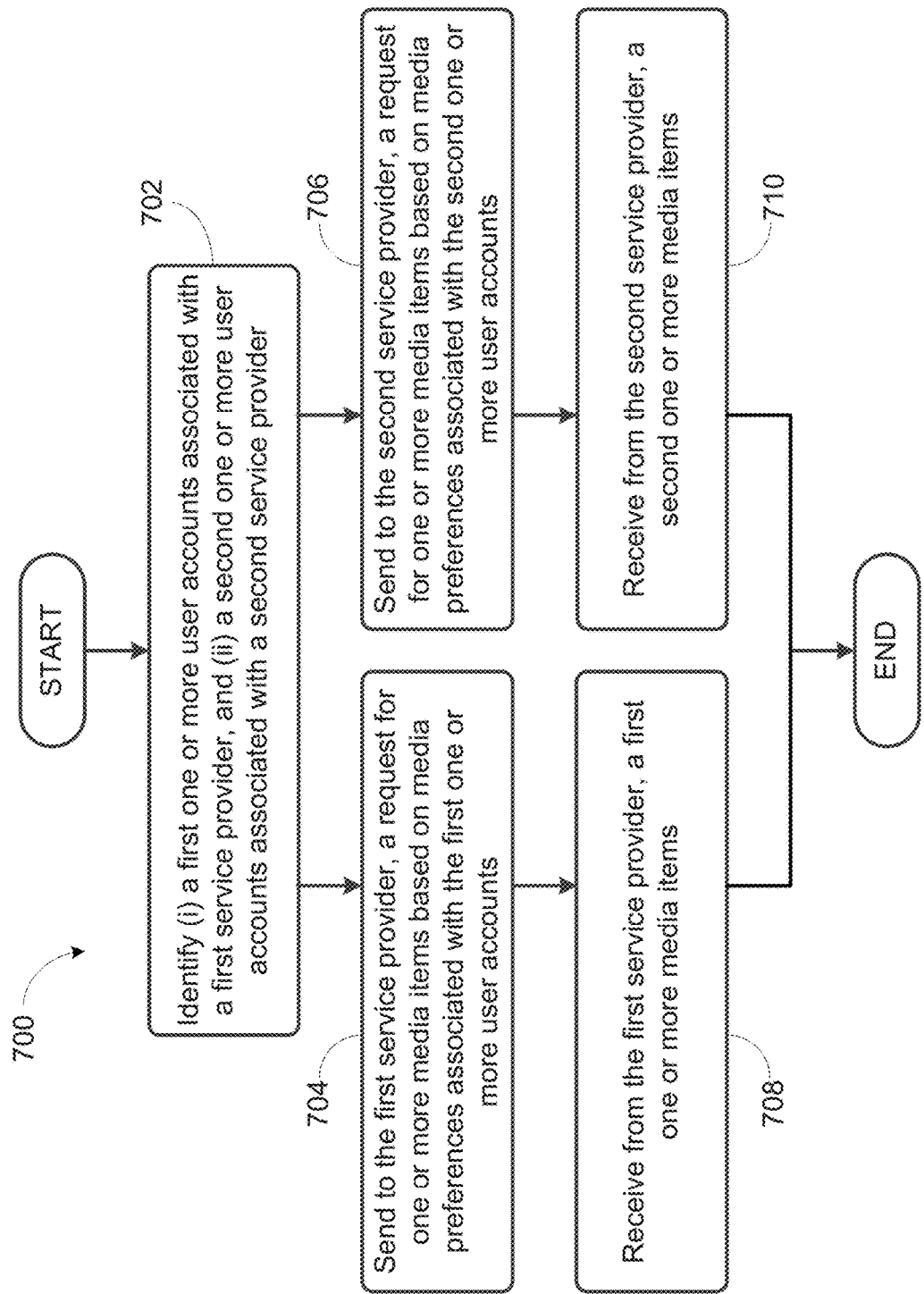
FIG. 7 shows a second example flow diagram for receiving media content based on media preferences of multiple users.

Method 700 shown in FIG. 7 presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. In other words, the method 600 may be performed by any one or more of the devices, systems, and servers described above. Method 700 may include one or more operations, functions, or actions as illustrated by one or more of blocks 702-710. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 702, the method 700 involves identifying, (i) a first one or more user accounts associated with a first service provider, and (ii) a second one or more user accounts associated with a second service provider. In one example, the identifying of the first one or more user accounts and second one or more user accounts based on the guest list may be similar to that of identifying a plurality of user accounts discussed above in connection to block 602. As such, any relevant discussions above may also be applied to block 702. In this case, the first one or more user accounts may be associated with a first service provider, while the second one or more user accounts may be associated with a second service provider.

As indicated above, the method 700 may be implemented in a case when a service provider is not capable of providing media content based on media preferences associated with more than one user account. As such, in some embodiments, the first service provider and the second service provider may be the same service provider. In this case, the first one or more user accounts may be a first user account associated with the service provider. And the second one or more user accounts may be a second user account associated with the same service provider. In some other embodiments, continuing with the examples above, the first service provider may be the service provider 502 and the second service provider may be the second service provider 504.

At block 704, the method 700 involves sending to the first service provider, a request for one or more media items based on media preferences associated with the first one or more user accounts, and at block 706, the method 700 involves sending to the second service provider, a request for one or more media items based on media preferences associated with the second one or more user accounts. In one example, the sending of requests to the first service provider and the second service provider may be similar to that discussed above in connection to block 604. As such, any relevant discussions above may also be applied to blocks 704 and 706. The method 700 however, may involve sending the request to the first service provider at block 704, independent of sending the request to the second service provider at block 706. The requests may be independent of one another, even if the first service provider and the second service provider are the same service provider.

At block 708, the method 700 involves receiving from the first service provider, a first one or more media items, and at block 710, the method 700 involves receiving from the second service provider, a second one or more media items. In one example, the receiving of the one or more media items may be similar to that discussed above in connection to block 606. As such, any relevant discussions above may also be applied to blocks 708 and 710. The method 700 however, may involve receiving the first one or more media items from the first service provider at block 708 independent of receiving the second one or more media items from the second service provider at block 710. The receiving of the one or more media items may be independent, even if the first service provider and second service provider are the same service provider.

In one example, at least one of the media items in the received first one or more media items and the received second one or more media items may be added to a playlist and/or playback queue associated with the media playback system 506. In one case, all media items in the first one or more media items and the second one or more media items may be added to the playlist and/or playback queue. In another case, a subset of media items from the first one or more media items and the second one or more media items may be selected and added to the playlist and/or playback queue. Such a selection of media items may be performed analogously to the identification of media items based on preferences of the plurality of user accounts described in connection to block 684 of the method 680 shown in FIG. 6B. In this case, the selection may be performed by the media playback system 506 (or a device associated with the media playback system 506) rather than by the first and/or second service providers.

The media items added to the playlist and/or playback queue may then be used when entertaining guests during the social event. As indicated previously, a host of the social event may modify the playlist and/or playback queue to further cater the media items to the social event. Other examples are also possible.

One having ordinary skill in the art will appreciate that while the embodiments described herein generally appear to apply to receiving media content for a social event based on a guest list from which user accounts may be identified, implementations for other scenarios are also possible. For instance, the guest list may be a dynamically and/or periodically updated list of guests that are present at the social event (i.e. the guest list may include users who have "checked-in" to the social event). Accordingly, the media playback system 506 may request from one or more service providers, media content based on media preferences of users that are present where media content is being played by the media playback system 506. In such a case, media content that is played by the media playback system 506 may vary over time as guests arrive and leave. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein involve receiving media content based on the preferences of multiple users. In one embodiment, a method is provided. The method involves identifying, by a computing device, a plurality of user accounts associated with a first service provider, sending, by the computing device, to the first service provider, a request for one or more media items based on media preferences associated with the plurality of user accounts associated with the first service provider, and receiving, by the computing device, the one or more media items from the service provider.

In another embodiment, a device is provided. The device includes a processor, and memory having stored thereon instructions executable by the processor to cause the device to perform functions. The functions include identifying a plurality of user accounts associated with a first service provider, sending to the first service provider, a request for one or more media items based on media preferences associated with the plurality of user accounts associated with the first service provider, and receiving the one or more media items from the service provider.

In another embodiment, a non-transitory computer readable memory is provided. The non-transitory computer readable memory has stored thereon instructions executable by a computing device to cause the computing device to perform functions. The functions include identifying a plurality of user accounts associated with a first service provider, sending to the first service provider, a request for one or more media items based on media preferences associated with the plurality of user accounts associated with the first service provider, and receiving the one or more media items.

In another embodiment, a method is provided. The method involves identifying, by a computing device, (i) a first one or more user accounts associated with a first service provider, and (ii) a second one or more user accounts associated with a second service provider. The method further involves, sending, by the computing device to the first service provider, a request for one or more media items based on media preferences associated with the first one or more user accounts, sending, by the computing device to the second service provider, a request for one or more media items based on media preferences associated with the second one or more user accounts, receiving, by the computing device from the first service provider, a first one or more media items, and receiving, by the computing device from the second service provider, a second one or more media items.

In another embodiment, a device is provided. The device includes a processor, and memory having stored thereon instructions executable by the processor to cause the device to perform functions. The functions include identifying, by a computing device (i) a first one or more user accounts associated with a first service provider, and (ii) a second one or more user accounts associated with a second service provider, sending to the first service provider, a request for one or more media items based on media preferences associated with the first one or more user accounts, sending to the second service provider, a request for one or more media items based on media preferences associated with the second one or more user accounts, receiving from the first service provider, a first one or more media items, and receiving from the second service provider, a second one or more media items.

In another embodiment, a non-transitory computer readable memory is provided. The non-transitory computer readable memory has stored thereon instructions executable by a computing device to cause the computing device to perform functions. The functions include identifying, by a computing device (i) a first one or more user accounts associated with a first service provider, and (ii) a second one or more user accounts associated with a second service provider, sending to the first service provider, a request for one or more media items based on media preferences associated with the first one or more user accounts, sending to the second service provider, a request for one or more media items based on media preferences associated with the second one or more user accounts, receiving from the first service provider, a first one or more media items, and receiving from the second service provider, a second one or more media items.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A media playback system comprising:
   a communications interface;
   at least one processor; and
   at least one non-transitory computer-readable medium comprising program instructions that are executable by the at least one processor such that the media playback system is configured to perform functions comprising:
   receiving data representing a playback command corresponding to at least one playback device of the media playback system;
   determining two or more user profiles of the media playback system, the determined two or more user profiles comprising a first user profile and a second user profile, wherein the determined two or more user profiles are a subset of user profiles registered with the media playback system;
   identifying audio tracks based on respective media preferences associated with the determined two or more user profiles of the media playback system, wherein identifying audio tracks based on the respective media preferences associated with the determined two or more user profiles of the media playback system comprises identifying the audio tracks based on first media preferences associated with the first user profile and second media preferences associated with the second user profile; and
   causing the at least one playback device of the media playback system to play back a playlist of the identified audio tracks.

2. The media playback system of claim 1, wherein receiving the data representing the playback command corresponding to at least one playback device of the media playback system comprises receiving, via the communications interface from a network device, the data representing the playback command corresponding to at least one playback device.

3. The media playback system of claim 1, wherein the first user profile is associated with a first user account of a streaming audio service and the second user profile is associated with a second user account of the streaming audio service, and wherein identifying the audio tracks based on first media preferences associated with the first user profile and second media preferences associated with the second user profile comprises:
   identifying at least one first audio track of the audio tracks based on media preferences of the first user account of the streaming audio service; and
   identifying at least one second audio track of the audio tracks based on media preferences of the second user account of the streaming audio service.

4. The media playback system of claim 1, wherein identifying the audio tracks based on first media preferences associated with the first user profile and second media preferences associated with the second user profile comprises:
   identifying first audio tracks based on the first media preferences associated with the first user profile; and
   identifying second audio tracks based on the second media preferences associated with the second user profile; and
   identifying the audio tracks from among the identified first audio tracks and the identified second audio tracks.

5. The media playback system of claim 1, wherein the data representing the playback command corresponding to at least one playback device of the media playback system indicates a first playback device and a second playback device, and wherein causing the at least one playback device of the media playback system to play back the playlist of the identified audio tracks comprises causing the first playback device and the second playback device to play back the playlist of the identified audio tracks in synchrony, wherein the first playback device transmits playback timing information to the second playback device to synchronize the playback.

6. The media playback system of claim 1, wherein the data representing the playback command corresponding to at least one playback device of the media playback system indicates a particular playback device, and wherein the particular playback device comprises the at least one processor and the at least one non-transitory computer-readable medium.

7. The media playback system of claim 1, wherein identifying audio tracks based on respective media preferences associated with the determined two or more user profiles of the media playback system comprises identifying, via one or more media playback system servers, the audio tracks based on the respective media preferences associated with the determined two or more user profiles of the media playback system.

8. The media playback system of claim 7, wherein identifying, via the one or more media playback system servers, the audio tracks based on the respective media preferences associated with the determined two or more user profiles of the media playback system comprises:
   querying a database for media preference data associated with the determined two or more user profiles of the media playback system; and
   identifying the audio tracks based on the queried media preference data.

9. A method to be performed by a computing system, the method comprising:
   receiving data representing a playback command corresponding to at least one playback device of a media playback system;
   determining two or more user profiles of the media playback system, the determined two or more user profiles comprising a first user profile and a second user profile, wherein the determined two or more user profiles are a subset of user profiles registered with the media playback system;
   identifying audio tracks based on respective media preferences associated with the determined two or more user profiles of the media playback system, wherein identifying audio tracks based on the respective media preferences associated with the determined two or more user profiles of the media playback system comprises identifying the audio tracks based on first media preferences associated with the first user profile and second media preferences associated with the second user profile; and
   causing the at least one playback device of the media playback system to play back a playlist of the identified audio tracks.

10. The method of claim 9, wherein receiving the data representing the playback command corresponding to at least one playback device of the media playback system comprises receiving, via a communications interface from a network device, the data representing the playback command corresponding to at least one playback device.

11. The method of claim 9, wherein identifying the audio tracks based on the respective media preferences associated with the determined two or more user profiles of the media playback system comprises:
  querying a database for media preference data associated with the determined two or more user profiles of the media playback system; and
  identifying the audio tracks based on the queried media preference data.

12. The method of claim 9, wherein the first user profile is associated with a first user account of a streaming audio service and the second user profile is associated with a second user account of the streaming audio service, and wherein identifying the audio tracks based on first media preferences associated with the first user profile and second media preferences associated with the second user profile comprises:
  identifying at least one first audio track of the audio tracks based on media preferences of the first user account of the streaming audio service; and
  identifying at least one second audio track of the audio tracks based on media preferences of the second user account of the streaming audio service.

13. The method of claim 9, wherein identifying the audio tracks based on first media preferences associated with the first user profile and second media preferences associated with the second user profile comprises:
  identifying first audio tracks based on the first media preferences associated with the first user profile; and
  identifying second audio tracks based on the second media preferences associated with the second user profile; and
  identifying the audio tracks from among the identified first audio tracks and the identified second audio tracks.

14. The method of claim 9, wherein the data representing the playback command corresponding to at least one playback device of the media playback system indicates a first playback device and a second playback device, and wherein causing the at least one playback device of the media playback system to play back the playlist of the identified audio tracks comprises causing the first playback device and the second playback device to play back the playlist of the identified audio tracks in synchrony, wherein the first playback device transmits playback timing information to the second playback device to synchronize the playback.

15. A network device comprising:
  a communications interface;
  at least one processor; and
  at least one non-transitory computer-readable medium comprising program instructions that are executable by the at least one processor such that the network device is configured to perform functions comprising:
    receiving data representing a playback command corresponding to at least one playback device of a media playback system;
    determining two or more user profiles of the media playback system, the determined two or more user profiles comprising a first user profile and a second user profile, wherein the determined two or more user profiles are a subset of user profiles registered with the media playback system;
    identifying audio tracks based on respective media preferences associated with the determined two or more user profiles of the media playback system, wherein identifying audio tracks based on the respective media preferences associated with the determined two or more user profiles of the media playback system comprises identifying the audio tracks based on first media preferences associated with the first user profile and second media preferences associated with the second user profile; and
    causing the at least one playback device of the media playback system to play back a playlist of the identified audio tracks.

16. The network device of claim 15, wherein the first user profile is associated with a first user account of a streaming audio service and the second user profile is associated with a second user account of the streaming audio service, and wherein identifying the audio tracks based on first media preferences associated with the first user profile and second media preferences associated with the second user profile comprises:
  identifying at least one first audio track of the audio tracks based on media preferences of the first user account of the streaming audio service; and
  identifying at least one second audio track of the audio tracks based on media preferences of the second user account of the streaming audio service.

17. The network device of claim 15, wherein identifying the audio tracks based on first media preferences associated with the first user profile and second media preferences associated with the second user profile comprises:
  identifying first audio tracks based on the first media preferences associated with the first user profile; and
  identifying second audio tracks based on the second media preferences associated with the second user profile; and
  identifying the audio tracks from among the identified first audio tracks and the identified second audio tracks.

18. The network device of claim 15, wherein the data representing the playback command corresponding to at least one playback device of the media playback system indicates a first playback device and a second playback device, and wherein causing the at least one playback device of the media playback system to play back the playlist of the identified audio tracks comprises causing the first playback device and the second playback device to play back the playlist of the identified audio tracks in synchrony, wherein the first playback device transmits playback timing information to the second playback device to synchronize the playback.

19. The network device of claim 15, wherein identifying audio tracks based on respective media preferences associated with the determined two or more user profiles of the media playback system comprises identifying, via one or more media playback system servers, the audio tracks based on the respective media preferences associated with the determined two or more user profiles of the media playback system.

20. The network device of claim 19, wherein identifying the audio tracks based on the respective media preferences associated with the determined two or more user profiles of the media playback system comprises:
  querying a database for media preference data associated with the determined two or more user profiles of the media playback system; and
  identifying the audio tracks based on the queried media preference data.

\* \* \* \* \*